WITNESSES.

INVENTOR.
Alan N. Ayers
BY

Dec. 19, 1967   A. N. AYERS   3,358,605
PRESSURE SENSITIVE SWITCH
Filed Jan. 4, 1946   3 Sheets-Sheet 2

WITNESSES.
Ralph Carlile Smith
Ralph G. Miller

INVENTOR.
Alan N. Ayers
BY
Robert A. Lavender

Dec. 19, 1967     A. N. AYERS     3,358,605
PRESSURE SENSITIVE SWITCH

Filed Jan. 4, 1946     3 Sheets-Sheet 3

WITNESSES.     INVENTOR.
Alan N. Ayers
BY

United States Patent Office 3,358,605
Patented Dec. 19, 1967

3,358,605
PRESSURE SENSITIVE SWITCH
Alan N. Ayers, Estancia, N. Mex., assignor to the United States of America as represented by the United States Atomic Energy Commission
Filed Jan. 4, 1946, Ser. No. 639,139
2 Claims. (Cl. 102—81)

This invention relates generally to pressure actuated switch mechanisms.

A primary object of the invention resides in the provision of an improved pressure responsive switch having general utility but which has particular utility in connection with airborne ordnance devices. Pressure responsive switches heretofore known in the art have been found unsatisfactory for use in connection with the airborne ordnance devices since proper operation cannot be insured under the conditions existent in connection with this use. For example, a switch of this type when associated with an aerial bomb, is subjected to a high magnitude of mechanical vibration during take-off and flight of the airplane carrying the bomb, and is further subjected to vibrational stresses such as are imparted by yaw through the trajectory of a device released from aircraft.

A further restriction imposed upon a pressure responsive switch for use as an aerial bomb altitude fuse relates to the small change in altitude to which the switch must be responsive. For example such a switch must, in some instances, be responsive to altitude change in the order of a few feet to be of value for a specific type of use. While the use of bellows or sylphons as an element responsive to changes of surrounding pressure is well known in the art, known devices were found inadequate to meet the above requirements of dependability of operation during subjection to considerable mechanical vibration plus retention of sensitivity to pressure changes of relatively small magnitude.

A further object of the invention is to provide a pressure sensitive switch which includes a contact arm having a pair of bellows associated therewith in a manner to prevent the contact arm from vibrating in response to mechanical vibrations to which the switch may be subjected.

A still further object of the invention is to provide an improved pressure responsive electrical switch including means for adjustment for actuation by pressure changes of a magnitude resulting from altitude changes of a few feet.

A still further object is to provide an hermetically sealed pressure sensitive electrical switch which is responsive to pressure changes at an area remote therefrom the pressure changes being transmitted from the remote area to the sealed switch through a conduit.

Further advantages and modifications of the present invention will appear to persons skilled in the art upon examination of the drawings, descriptions and the claims appended thereto.

Figures 1, 2:
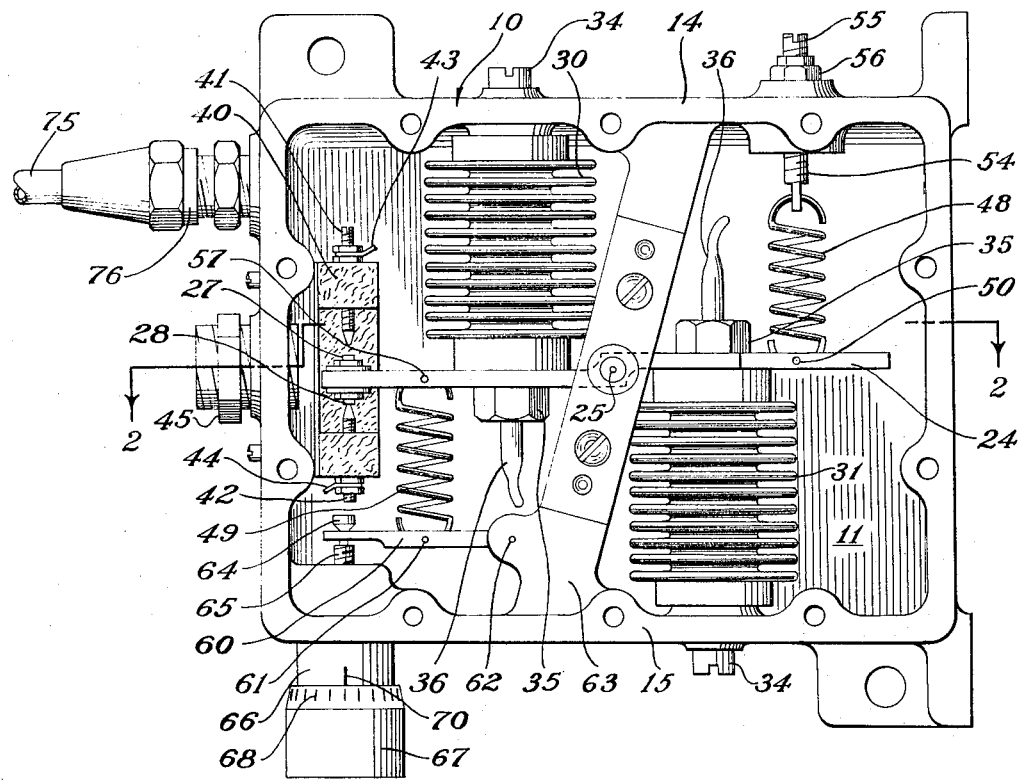
FIGURE 1 is an elevational view of a device incorporating a preferred embodiment of the invention. A side plate, shown in FIGURE 2, having been removed to expose the internal structure.
FIGURE 2 is an horizontal section of the device of FIGURE 1 along line 2—2.

Referring to FIGURES 1 and 2, the device comprises generally a rectangular housing 10 including a back wall 11, integral end walls 12 and 13, integral top and bottom walls 14 and 15, and a detachable front wall 16 normally maintained in clamped engagement as shown by clamp screws 18, a suitable gasket 20 being interposed between the side and end wall margins and marginal portions of the end wall to effectively seal the interior of the housing from the surrounding atmosphere. Within the housing is disposed a contact carrying bar 24 pivotally mounted at 25 and provided at the left-hand end, as viewed, with a pair of contact points 27 and 28. Bar 24 is off-set in the area of mounting 25 as best shown in FIGURE 1. A pair of bellows 30 and 31 are interposed respectively between top wall 14 and the left-hand portion of bar 24 and bottom wall 15 and the right-hand portion of bar 24. Bellows 30 and 31 are secured to the chamber walls by suitable clamp screws 34 and to bar 24 by lock nuts 35. The bellows are internally evacuated, metallic tubes 36 leading therefrom being sealed as shown subsequent to evacuation. Bellows 30 and 31 are of light metal, hence they present no substantial resistance to axial distortion resulting from the pivoting of bar 24.

A contact point supporting assembly 40 is provided in a position transverse to the double contact end of bar 24, assembly 40 being suitably channeled to provide an electrically insulating mount for a pair of elongated adjustable contact pins 41 and 42, mounted in opposition and adapted to be properly spaced in relation to double contacts 27 and 28 to provide make and break of an electrical circuit associated therewith. Conduits 43 and 44, illustrated broken, are preferably brought out through casing wall 13 by means of a double amphenol connector 45 which extends through wall 13 in gas sealing relation therewith.

To insure positive static as well as dynamic balance of bar 24, a pair of adjustable compression springs 48 and 49 are provided. Spring 48 is maintained under tension, the lower end being secured to bar 24 by a pin 50, the upper end being adjustably supported in respect to the upper casing wall 14 by means of an elongated externally threaded rod 54 having an aperture terminus engaging spring 48 within the housing and a slotted terminus 55 externally of the housing. Suitable lock nuts 56 are provided for the adjustment of rod 54 in respect to wall 14 while maintaining gas sealing relation therewith. Spring 49 has its upper end engaged with bar 24 by means of pin 57 and its lower end secured to lever 60 by pin 61. One end of lever 60 is pivoted at 62 to a strut 63, integral with the housing. The opposite end of lever 60 is in loose fit engagement with the inner end 64 of a threaded rod 65, axially adjustable by means of a suitable gear assembly, not shown, within cylindrical housing 66. Rotation of rod 64 is effected through a vernier knob 67 provided with a calibrated dial 68, a reference point 70 being provided on housing 66. Fluid communication between the interior of the casing 10 and a point exteriorly of the casing and spaced therefrom is established through conduit 75 leading through a conventional fitting 76.

As stated above the device is particularly adapted for use under conditions requiring sensitivity to rapidly occurring altitude changes and reliability of operation during subjection to vibration and to other forces, for example those imparted by centrifugal or centripetal forces due to varying degrees of torsional stresses. While the structural design of the switch prevents linear acceleration it is preferred that the switch be mounted with the pivotal axis of bar 24 in right angular relation to the longitudinal axis of an aerial missile to insure that the switch is nonresponsive to angular acceleration of such a missile. As later described, conduit 75 may lead to a pressure equalizing manifold for establishment of pressure within housing 10 substantially equal to the pressure maintained within the manifold chamber. The employment of a pair of sylphon bellows, 30 and 31, disposed to function in substantially diametric opposition in respect to a common pivot point 25 greatly reduces the tendency of contacting bar 24 to respond to the introduced mechanical forces above described. The tension applied to opposite ends of bar 24 by springs 48 and 49 working counter to pressure changes occurring between the interior and exterior of bellows 30 and 31 completely prevents pivotal motion of bar 24 from any cause other than from change of atmospheric pressure. The amount of atmospheric pressure change to which the device is responsive may conveniently and rapidly be adjusted through vernier knob 67.

Figure 3:
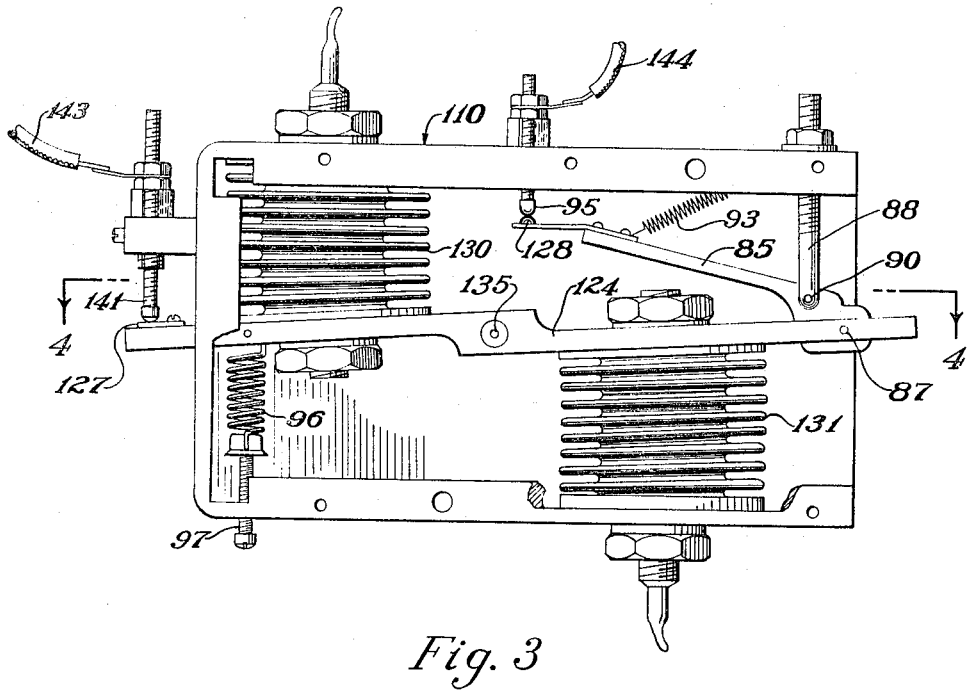
FIGURE 3 is an elevational view of a device incorporating an alternate embodiment of the invention; a side plate, shown in FIGURE 4, having been removed to expose the internal mechanism.
Figure 4:
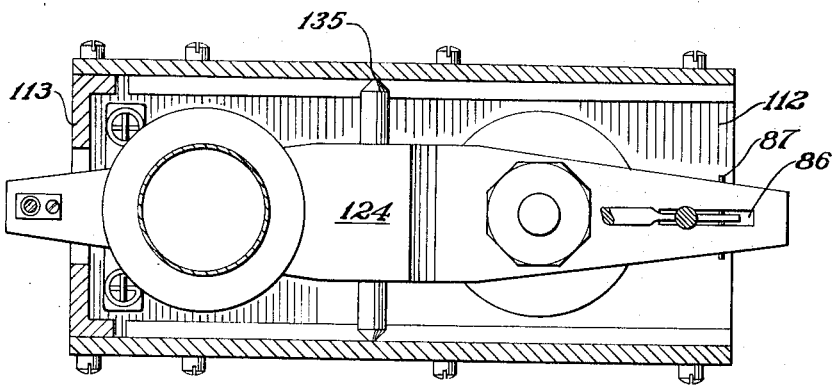
FIGURE 4 is an horizontal section along line 4—4, FIGURE 3.

An alternate embodiment of the present invention is disclosed in FIGURES 3 and 4 in which the interior of housing 110 communicates directly with the atmosphere through open end 112 and an apertured end wall 113, the device being adapted to respond to changes in atmospheric pressure in the immediate vicinity of the switch rather than at a point remote therefrom. However, if desired, housing 110 may be sealed to the atmosphere as in the previously described device. A contact bar 124 is pivoted at 135, with bellows 130 and 131 disposed on opposite sides thereof for attachment to opposite casing walls as above described. The left hand end of bar 124, as viewed, is provided with a contact plate 127 for association with an adjustable contact point 141 connected through conduit 143 to a suitable electric circuit, not shown. The opposite end of bar 124 carries a lever 85, bar 124 being provided with an axially extending aperture 86 through which one end of lever 85 extends for pivotal engagement therewith by means of pin 87. Adjustable rod 88 has its lower terminus pivotally engaging lever 85 at 90. The opposite end of bar 85 carries a contact point at 128, a fixed contact point 95 depending from top wall of casing 110 associating with the electrical circuit mentioned through connector 144. Spring 93 extends between the top wall of casing 110 and the upper end portion of lever 85 to bias lever 85 toward a contact closing position. A helical spring 96 is interposed between the opposite end of bar 129 and the bottom wall of housing 110, adjustment of tension being provided for by screw 97.

The device of FIGURES 3 and 4 is adapted to make and break contact between conduits 143 and 144 in response to atmospheric pressure changes of relatively small magnitude, in somewhat similar manner to the device of FIGURES 1 and 2. Employment of lever 85 in the manner shown to employ substantially toggle action provides acceleration of the make and break between contact 95 and 128, and since circuit closure is dependent upon contact of both sets of contact points, the rapidity of switch action is improved. While the preferred mechanism described in connection with the apparatus of FIGURES 1 and 2 has been found to give results superior to the results obtained by the mechanism of FIGURES 3 and 4 in the presence of substantial vibration and other imparted stresses, the alternate construction performs satisfactorily under somewhat less severe conditions.

Figure 5:
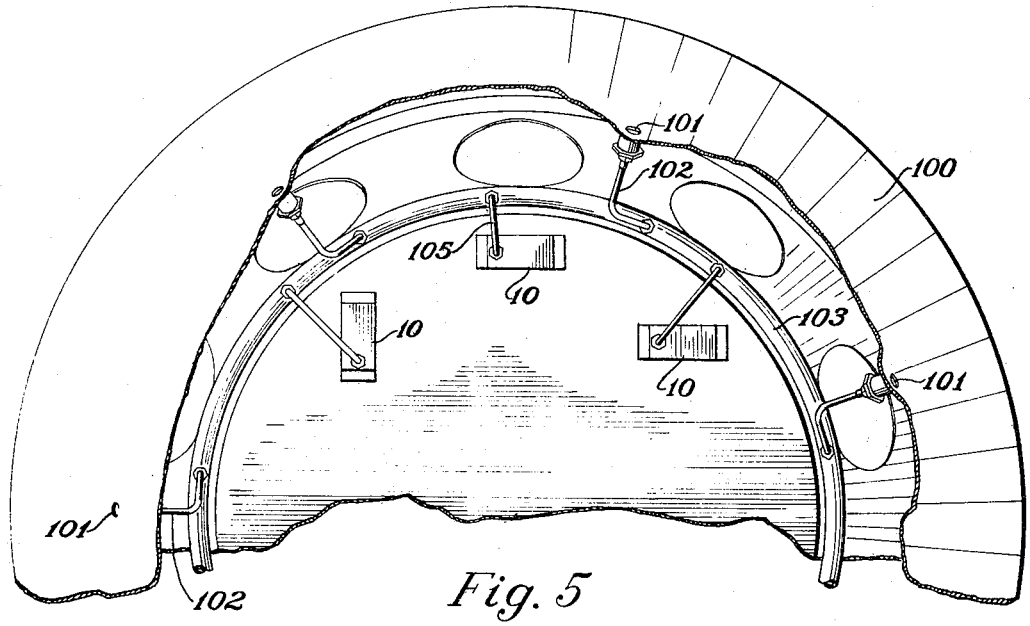
FIGURE 5 is a fragmentary view in elevation of an aerial bomb illustrating the switches of FIGS. 1 through 4 associated with a pressure ring.
Figure 6:
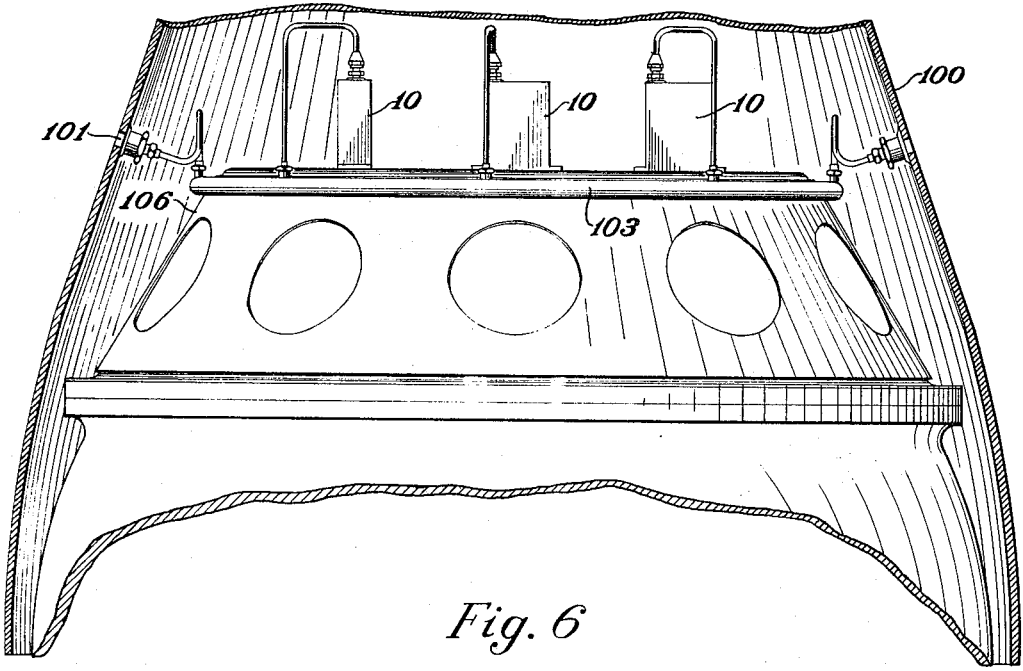
FIGURE 6 is a fragmentary view, partially in horizontal section, of the device of FIGURE 5.

FIGURES 5 and 6 disclose the manner in which a plurality of the devices above described may be employed within an aerial missile in association with a pressure equalizing device in a manner to counteract rapidly changing pressures throughout the peripheral area of such a missile due, for example, to yaw, rotation and other causes. A casing 100 which may be the outer shell or casing of a bomb is provided with a plurailty of apertures 101, preferably in a predetermined geometrical arrangement. A plurality of fluid conduits 102 lead respectively from apertures 101 to an annular manifold housing 103. Apertures 101 may be equally spaced circumferentially of casing 100 as may conduits 102 be spaced in respect to housing 103. At points intermediate the entrance of conduits 102 into housing 103 preferably midway therebetween, conduits 105 extend to provide fluid communication between the housing interior and the interior of the pressure activated switches 10. As best shown in FIGURE 6, switch 10 may be mounted, for example, on an inner housing 110 containing high explosive, pressure manifold housing 103 encircling the inner housing with apertures 101 provided in an outer casing which is employed solely for the purpose of providing proper fairing to insure desired trajectory characteristics. If desired the manifold housing 103 may be employed with a plurality of conduits leading to the exterior missile housing as shown, with but a single pressure responsive switch 10 associated therewith, since in the apparatus shown the pressure through the internal area of manifold housing 103 is effectively equalized throughout the fall of an aerial missile regardless of position or change of position of such a missile during its fall.

Upon examination of the above disclosure and the appended drawings, other modifications and adaptations of the present invention will be readily apparent to persons skilled in the art without departure from the spirit and scope of the present invention which is limited only in the manner defined in the appended claims.

I claim:

1. An atmospheric pressure actuated switch highly stable to vibration, comprising in combination, an outer enclosing case in communication with the atmosphere, pivot means within said case, an elongated balanced member rotatably mounted on said pivot means forming two lever arms, similar bellows means responsive to atmospheric pressure connected equidistant from the pivot on each of said arms but on opposite sides for cooperatively rotating said member in response to changes in atmospheric pressure and for operatively opposing each other in response to linear acceleration and vibrational forces, adjustable spring bias means mounted between said elongated member and the case for opposing the pressure response of said two similar pressure-operated means, an actuating electrical circuit including said elongated member whereby rotation of said member operates to open and close said actuating circuit, and means for adjusting the closing of the circuit for predetermined atmospheric pressures.

2. In an aerial explosive missile including detonating means and an electrical circuit for actuation thereof, an annular pressure equalizing chamber mounted in right angularity to the longitudinal axis of said missile, said chamber being provided with ports symmetrically spaced about its circumference in direct communication with the atmosphere, at least one atmospheric pressure actuated switch spaced from said chamber and a duct for conducting equalized atmospheric pressure from said chamber to said switch, said pressure actuated switch comprising an outer enclosing case in communication with said duct, pivot means within said case, an elongated balanced member rotatably mounted on said pivot means forming two lever arms, similar bellows means responsive to atmospheric pressure connected equidistant from the pivot on each of said arms but on opposite sides for cooperatively rotating said member in response to changes in atmospheric pressure and for operatively opposing each other in response to linear acceleration and vibrational forces, adjustable spring bias means mounted between said elongated member and the case for opposing the pressure response of said two similar pressure-operated means, said elongated member being included in said electrical circuit whereby rotation of said member operates to open and close said electrical circuit, and means for adjusting the closing of the circuit for predetermined atmospheric pressures.

References Cited

UNITED STATES PATENTS

| | | | |
|---|---|---|---|
| 2,110,552 | 3/1938 | Hayden | 102—70 |
| 2,063,613 | 12/1936 | McCarthy | 200—81.5 |
| 2,031,502 | 2/1936 | Powell | 200—81.5 |

BENJAMIN A. BORCHELT, *Primary Examiner.*

ALEXANDER BISHOFF, JAMES L. BREWRINK, *Examiners.*

S. BOYD, G. H. GLANZMAN, *Assistant Examiners.*